United States Patent
Adachi

(10) Patent No.: US 10,631,223 B2
(45) Date of Patent: Apr. 21, 2020

(54) COMMUNICATION METHOD AND COMMUNICATION DEVICE

(71) Applicant: KYOCERA CORPORATION, Kyoto (JP)

(72) Inventor: Hiroyuki Adachi, Kawasaki (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 16/140,232

(22) Filed: Sep. 24, 2018

(65) Prior Publication Data

US 2019/0028947 A1    Jan. 24, 2019

Related U.S. Application Data

(63) Continuation of application No. PCT/JP2017/011810, filed on Mar. 23, 2017.

(Continued)

(51) Int. Cl.
| | |
|---|---|
| *H04W 36/30* | (2009.01) |
| *H04W 36/00* | (2009.01) |
| *H04W 76/11* | (2018.01) |
| *H04W 76/27* | (2018.01) |
| *H04W 36/08* | (2009.01) |
| *H04W 60/00* | (2009.01) |

(Continued)

(52) U.S. Cl.
CPC ....... *H04W 36/30* (2013.01); *H04W 36/0009* (2018.08); *H04W 36/0066* (2013.01); *H04W 36/08* (2013.01); *H04W 60/00* (2013.01); *H04W 76/11* (2018.02); *H04W 76/14* (2018.02); *H04W 76/27* (2018.02); *H04W 8/005* (2013.01); *H04W 36/0069* (2018.08); *H04W 76/20* (2018.02); *H04W 80/02* (2013.01); *H04W 88/04* (2013.01)

(58) Field of Classification Search
CPC .... H04B 7/0626; H04B 7/022; H04B 7/0619; H04B 7/0695; H04B 7/088; H04W 76/10
See application file for complete search history.

(56) References Cited

U.S. PATENT DOCUMENTS

2008/0192694 A1* 8/2008 Lee .................... H04L 12/28
2013/0324114 A1   12/2013 Raghothaman et al.
(Continued)

FOREIGN PATENT DOCUMENTS

| JP | 2006-270207 A | 10/2006 |
| JP | 2010-081435 A | 4/2010 |
| WO | 2015/096845 A1 | 7/2015 |

OTHER PUBLICATIONS

3rd Generation Partnership Project; "Technical Specification Group Radio Access Network; Evolved Universal Terrestrial Radio Access (E-UTRA) and Evolved Universal Terrestrial Radio Access Network (E-UTRAN)"; 3GPP TS 36.300 V13.2.0; Dec. 2015; pp. 1-290; Release 13; 3GPP Organizational Partners.

Kyocera; "Multiple SCIs for UE-to-Network Relay"; 3GPP TSG RAN WG1 Meeting #81; R1-153106; May 25-29, 2015; Fukuoka, Japan.

(Continued)

*Primary Examiner* — Ronald B Abelson
(74) *Attorney, Agent, or Firm* — Studebaker & Brackett PC

(57) ABSTRACT

In a communication method, a base station provides a specific resource pool available only between short-range devices, of resource pools available between devices in a sidelink. A first communication device executes, at least one of transmission and reception of a sidelink signal to and from a second communication device that is a short-range communication device, by using the specific resource pool.

15 Claims, 11 Drawing Sheets

Related U.S. Application Data

(60) Provisional application No. 62/315,853, filed on Mar. 31, 2016.

(51) Int. Cl.
*H04W 76/14* (2018.01)
*H04W 76/20* (2018.01)
*H04W 88/04* (2009.01)
*H04W 8/00* (2009.01)
*H04W 80/02* (2009.01)

(56) References Cited

U.S. PATENT DOCUMENTS

| | | | |
|---|---|---|---|
| 2015/0067366 A1* | 3/2015 | Lai | G06F 1/3293 |
| 2016/0337925 A1* | 11/2016 | Fujishiro | H04W 36/28 |

OTHER PUBLICATIONS

Kyocera; "Multiple transmissions to different destinations from the UE-to-Network Relay"; 3GPP TSG RAN WG1 Meeting #82; R1-154010; Aug. 24-28, 2015; Beijing, China.

Intel Corporation; "On Remaining Details of Power Control"; 3GPP TSG RAN WG1 Meeting #79; R1-144653; Nov. 17-21, 2014; San Francisco, USA.

Alcatel-Lucent Shanghai Bell, Alcatel-Lucent; "L3-based UE-to-network relays"; 3GPP TSG RAN WG1 Meeting #81; R1-152668; May 25-29, 2015; Fukuoka, Japan.

General Dynamics Broadband UK; "Discussion on Out-of-coverage D2D communication for public safety"; 3GPP TSG-RAN2#83; R2-132433; Aug. 19-23, 2013; Barcelona, Spain.

ZTE; "Service continuity for ProSe UE-to-network relay"; 3GPP TSG RAN WG2 #90; R2-152546; May 25-29, 2015; Fukuoka, Japan.

* cited by examiner

COMMUNICATION METHOD AND COMMUNICATION DEVICE

CROSS-REFERENCE TO RELATED APPLICATION

The present application is a continuation based on PCT Application No. PCT/JP2017/011810 filed on Mar. 23, 2017, which claims the benefit of U.S. Provisional Application No. 62/315,853 (filed on Mar. 31, 2016). The content of which is incorporated by reference herein in their entirety.

FIELD

The present disclosure relates to a communication method and a communication device which are used in a communication system.

BACKGROUND

In 3GPP (3rd Generation Partnership Project), which is a project aiming to standardize a mobile communication system, the specifications of proximity-based services (ProSes) have been designed (see Non Patent Document 1).

PRIOR ART DOCUMENT

Non-Patent Document

Non Patent Document 1: 3GPP Technical Specification "TS 36.300 V13.2.0" Jan. 13, 2016

SUMMARY

In a communication method according to one embodiment, a base station provides a specific resource pool available only between short-range devices, of resource pools available between devices in a sidelink. A first communication device executes, at least one of transmission and reception of a sidelink signal to and from a second communication device that is a short-range communication device, by using the specific resource pool.

A first communication device according to one embodiment comprises a controller configured to execute a process of receiving, from a base station, information indicating a specific resource pool available only between short-range devices, of resource pools available between devices in a sidelink. The controller is configured to execute at least one of transmission and reception of a sidelink signal to and from a second communication device that is a short-range communication device, by using the specific resource pool.

In a communication method according to one embodiment, a first communication device and a second communication device that is a short-range communication device establish a direct link used in a sidelink. The first communication device executes a handover from a first cell to a second cell. The first communication device executes the handover without releasing the direct link, when the second cell provides a specific resource pool available only between short-range devices, of resource pools available between devices in the sidelink.

A first communication device according to one embodiment comprises a controller configured to establish a direct link between the first communication device and a second communication device that is a short-range communication device, the direct link being a direct link used in a sidelink. The controller is configured to execute a handover from a first cell to a second cell. The controller is configured to execute the handover without releasing the direct link, when Among the possible resource pool available between devices in the side link, when the first communication device receives, from the second cell, information indicating a specific resource pool available only between short-range devices, of resource pools available between devices.

DESCRIPTION OF THE EMBODIMENT

Overview of Embodiments

Figure 1:
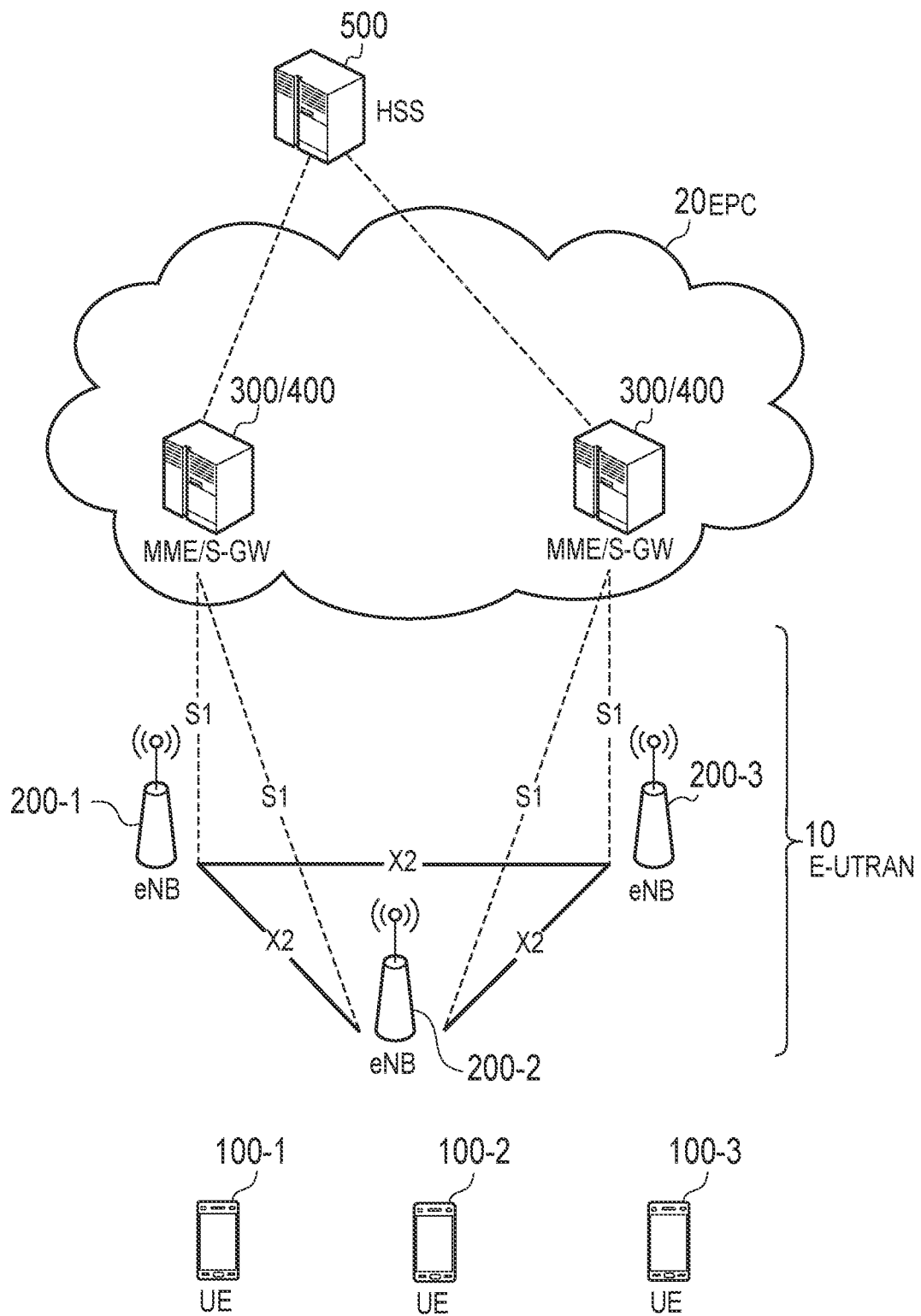
FIG. 1 is a diagram illustrating a configuration of an LTE system.

In a communication method according to one embodiment, a base station provides a specific resource pool available only between short-range devices, of resource pools available between devices in a sidelink. A first communication device executes, at least one of transmission and reception of a sidelink signal to and from a second communication device that is a short-range communication device, by using the specific resource pool.

The first communication device may transmit the sidelink signal at a lower transmission power than in a case of using another resource pool available between the devices in the sidelink, when the specific resource pool is used.

The first communication device may use the specific resource pool regardless of a state of reception of a radio signal from the base station.

The second communication device may transmit a first message for establishing a direct link used in the sidelink to the first communication device, by using the specific resource pool.

The first message may include an identifier of the second communication device. The first communication device may start an operation for establishing the direct link, when an identifier of the second communication device has been registered in the first communication device.

The second communication device may transmit the first message to the first communication device without receiving a discovery message from the first communication device, when an identifier of the first communication device has been registered in the second communication device.

The first communication device may transmit a second message for requesting a direct communication between the first communication device and the second communication device to a network apparatus.

The first communication may transmit the second message to the network apparatus, when the first message includes information indicating that the second communication device is not authorized on a network.

The first communication may transmit, as the second message, a remote UE report message including an identifier of the second communication device to the network apparatus, to execute a relay through use of the sidelink.

The network apparatus may transmit, a response message for allowing a direct communication between the first communication device and the second communication device to the first communication device, when an identifier of the second communication device has been registered in information of the first communication device.

The first communication device may transmit a third message for requesting a radio resource for a direct communication between the first communication device and a short-range communication device to the base station. The base station may transmit information on the radio resource and information on a transmission power in a case of using the radio resource to the first communication device. The transmission power may be a lower transmission power than in a case of using a radio resource available between the devices in the sidelink.

The information on the radio resource may include information on a resource pool available in the short-range communication device for which the direct communication is allowed.

In a communication method according to one embodiment, a first communication device and a second communication device that is a short-range communication device establish a direct link used in a sidelink. The first communication device executes a handover from a first cell to a second cell. The first communication device executes the handover without releasing the direct link, when the second cell provides a specific resource pool available only between short-range devices, of resource pools available between devices in the sidelink.

The first communication device may transmit a suspension message for suspending a direct communication through the direct link to the second communication device before executing the handover.

The first communication device may transmit the suspension message in response to transmitting a measurement report to the first cell or receiving a message for executing a handover from the first cell.

The first communication device may transmit the suspension message in response to a reception level, of a received signal from the first cell and the second cell, reaching a threshold.

The first communication device may receive the threshold from the first cell.

The first communication device may transmit information on a timer for measuring a period when suspension of the direct communication is enabled to the second communication device. The second communication device may release the direct link, when the timer expires before a sidelink signal is received from the first communication device via the direct link.

The second communication device may transmit a message for confirming whether to suspend the direct communication via the direct link to the first communication device, when a reception level of a received signal from the first cell falls below a threshold.

The first communication device may transmit the suspension message as a response to the confirmation message.

The second communication device may stop execution of a cell reselection in response to receiving the suspension message.

The second communication device may stop execution of a cell reselection in response to transmitting the confirmation message.

The first communication device may transmit a resumption message for resuming the direct communication to the second communication device, when the handover is successful. The first communication device may transmit a release message for releasing the direct link to the second communication device, when the handover is unsuccessful.

The first communication device may transmit the resumption message or the release message by using a resource pool that was used before the handover is executed.

The suspension message may include a resource pool used for transmitting the resumption message or the release message.

The first communication device may transmit an identifier of the second cell to the second communication device. The second communication device may select the second cell as a cell to be camped.

The second communication device may start execution of a cell reselection in response to receiving an identifier of the second cell from the first communication device.

The second communication device may start execution of a cell reselection in response to receiving the resumption message.

Embodiment

Mobile Communication System

The configuration of the mobile communication system according to the embodiment will be described. FIG. 1 is a diagram illustrating a configuration of a Long Term Evolution (LTE) system.

As illustrated in FIG. 1, the LTE system includes a User Equipment (UE) 100, an Evolved-Universal Terrestrial Radio Access Network (E-UTRAN) 10, and an Evolved Packet Core (EPC) 20.

The UE 100 corresponds to a communication device (radio terminal). The UE 100 is a mobile communication apparatus. The UE 100 performs radio communication with a cell (later described eNB 200). The configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The configuration of the eNB 200 will be described later.

The eNB 200 manages one or a plurality of cells. The eNB 200 performs radio communication with the UE 100 that has established connection with cells managed by the eNB 200. The eNB 200 has a radio resource management (RRM) function, a routing function of user data (hereinafter, simply referred to as "data"), a measurement control function for mobility control and scheduling, and the like. The "cell" is used as a term indicating the minimum unit of a radio communication area. The "cell" is also used as a term indicating a function of performing radio communication with the UE 100.

The EPC 20 corresponds to a core network. The EPC 20 may constitute a network together with the E-UTRAN 10. The EPC 20 includes an MME (Mobility Management Entity) 300 and an SGW (Serving Gateway) 400.

The MME 300 performs, for example, various kinds of mobility control for the UE 100. The SGW 400 performs, for example, data transfer control. The MME 300 and the SGW 400 are connected to the eNB 200 via a S1 interface.

In addition, the LTE system includes an HSS (Home Subscriber Server) 500. The HSS 500 manages user information. The HSS 500 handles, for example, service control and subscriber data. The HSS 500 communicates with the MME 300.

Figure 2:
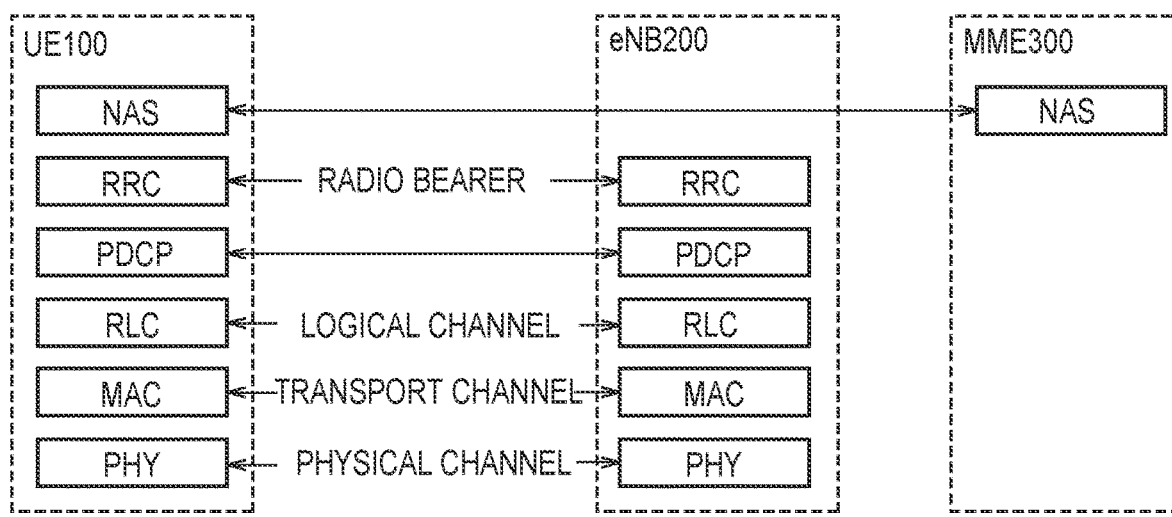
FIG. 2 is a protocol stack diagram of a radio interface in the LTE system.

FIG. 2 is a diagram illustrating protocol stack of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control signal are transferred via a transport channel. The MAC layer of the eNB 200 includes a scheduler (MAC scheduler). The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control information are transferred via a logical channel.

The PDCP layer performs header compression/decompression, and encryption/decryption.

The RRC layer is defined only in a control plane handling control signal. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected state. If there is not a connection (RRC connection) between the RRC of the UE 100 and the RRC of the eNB 200, the UE 100 is in an RRC idle state.

A non-access stratum (NAS) layer located above the RRC layer performs, for example, session management, mobility management, and the like.

Figure 3:
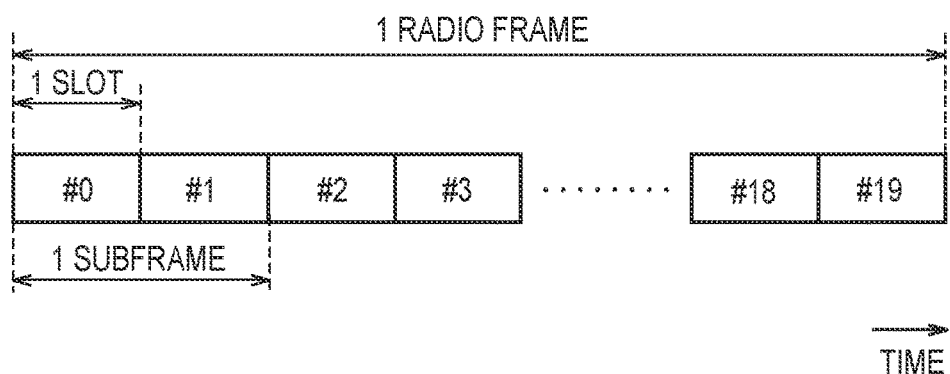
FIG. 3 is a configuration diagram of a radio frame used in the LTE system.

FIG. 3 is a configuration diagram of a radio frame used in the LTE system. In the LTE system, Orthogonal Frequency Division Multiple Access (OFDMA) is applied to downlink. In the LTE system, Single Carrier Frequency Division Multiple Access (SC-FDMA) is applied to uplink.

As illustrated in FIG. 3, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier. Radio resources (time/frequency resources) are allocated to the UE 100. In the frequency direction, radio resources (frequency resources) are constituted by resource blocks. In the time direction, radio resources (time resources) are constituted by subframes (or slots).

In the downlink, the section of the first several symbols of each subframe is an area that can be used as a physical downlink control channel (PDCCH) for transmitting a downlink control signal. The remaining part of each subframe is an area that can be used as a physical downlink shared channel (PDSCH) for transmitting downlink data.

In the uplink, both end portions in the frequency direction in each subframe are areas usable as a Physical Uplink Control Channel (PUCCH) for transmitting an uplink control signal. The remaining part of each subframe is an area that can be used as a physical uplink shared channel (PUSCH) for transmitting uplink data.

Proximity-Based Service

Proximity-based services (ProSes) will be described. The proximity-based service is a service that can be provided by a 3GPP system, based on communication devices (for example, UEs 100) in the vicinity of each other.

In ProSe, various types of radio signals are transmitted and received via a direct radio link between nodes (for example, between UEs), without passing through the eNB 200. The direct radio link in the ProSe is called "Sidelink".

The sidelink may be an interface for sidelink communication and sidelink discovery (for example, an interface between a UE and a UE). The sidelink communication is a function (AS functionality) for enabling ProSe direct communication (hereinafter, appropriately referred to as "direct communication"). The sidelink discovery is a function (AS functionality) for enabling ProSe direct discovery (hereinafter, appropriately referred to as "direct discovery").

The sidelink corresponds to a PC5 interface. The PC5 is a reference point between ProSe usable UEs (ProSe-enabled UE) used for a control plane and a user plane for the ProSe direct discovery, the ProSe direct communication, and a ProSe UE-Network relay.

For modes of the ProSe, "direct discovery (Direct Discovery)", "direct communication (Direct Communication)", and "Relay" are defined. "Relay" will be described later.

The direct discovery is a mode of searching for a partner destination by directly transmitting, between the UEs, a discovery message (discovery signal) that does not specify a specific destination. Further, the direct discovery is a procedure for discovering another UE in the proximity of a UE by using a direct radio signal in E-UTRA (Evolved Universal Terrestrial Radio Access) via the PC5. Alternatively, the direct discovery is a procedure adopted by a UE 100 capable of executing the proximity-based service for discovering another UE 100 capable of executing the proximity-based service by using only the capability of the two UEs 100 with the help of the E-UTRA technology. The direct discovery is supported only if the service is provided to the UE 100 by the E-UTRAN (eNB 200 (cell)). The service can be provided by the E-UTRAN if the UE 100 is either connected to the cell (eNB 200) or located in the cell.

As a resource allocation type for the transmission (announcement) of a discovery message (discovery signal), there are "Type 1" in which the UE 100 selects a radio resource, and "Type 2 (Type 2B)" in which the eNB 200 allocates the radio resource. In Type 1, the UE 100 may select a radio resource from the resource pools provided by the eNB 200.

A "Sidelink Direct Discovery" protocol stack includes a physical (PHY) layer, a MAC layer, and ProSe protocol. Between the physical layer of a UE (A) and the physical layer of a UE (B), a discovery signal is transmitted via a physical channel called a physical sidelink discovery channel (PSDCH). Between the MAC layer of the UE (A) and the MAC layer of the UE (B), a discovery signal is transmitted via a transport channel called a sidelink discovery channel (SL-DCH).

The direct communication is a mode in which data is directly transmitted between the UEs by specifying a specific destination (destination group). Further, the direct communication is communication between two or more UEs capable of executing the proximity-based service by user plane transmission using the E-UTRA technology via a path not passing through any network node.

As a resource allocation type of the direct communication, there are "Mode 1" in which the eNB 200 specifies a radio resource of the direct communication, and "Mode 2" in which the UE 100 selects a radio resource of the direct communication. In Mode 2, the UE 100 may select a radio resource from the resource pools provided by the eNB 200.

A direct communication protocol stack includes a physical (PHY) layer, a MAC layer, an RLC layer, and a PDCP layer. Between the physical layer of a UE (A) and the physical layer of a UE (B), a control signal is transmitted via a physical sidelink control channel (PSCCH), and data is transmitted via a physical sidelink shared channel (PSSCH). Further, a synchronization signal and the like may be transmitted via a physical sidelink broadcast channel (PSBCH). Between the MAC layer of the UE (A) and the MAC layer of the UE (B), data is transmitted via a transport channel called a sidelink shared channel (SL-SCH). Between the RLC layer of the UE (A) and the RLC layer of the UE (B), data is transmitted via a logical channel called a sidelink traffic channel (STCH).

Relay Using Proximity-Based Service

Figure 4:
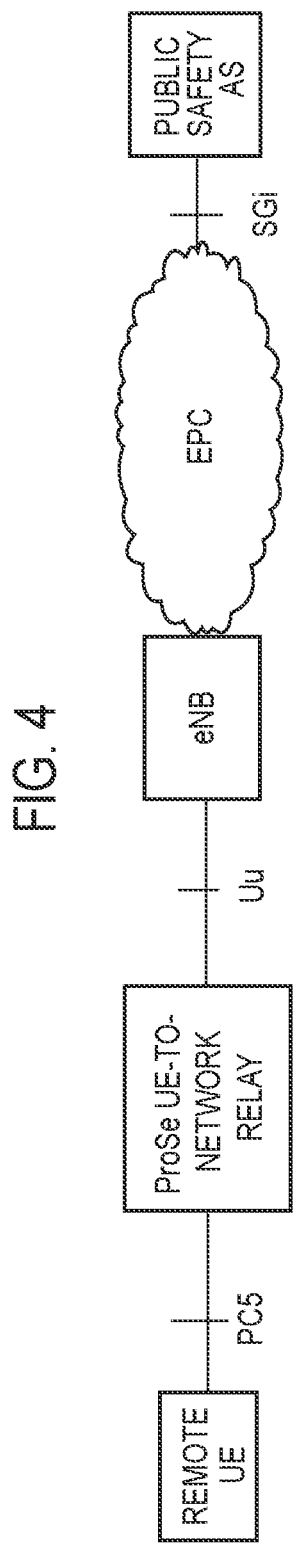
FIG. 4 is a diagram for describing a relay using a proximity-based service.

A relay using the proximity-based service (ProSe relay) will be described with reference to FIG. 4. FIG. 4 is a diagram for describing the relay using the proximity-based service.

In FIG. 4, a remote UE (Remote UE) is a UE 100 that communicates with a PDN (Packet Data Network) via a relay UE (ProSe UE-to-Network Relay). The remote UE may be a UE for public safety (ProSe-enabled Public Safety UE).

The "ProSe-enabled Public Safety UE" is configured such that an HPLMN (Home Public Land Mobile Network) is authorised for use for public safety. The "ProSe-enabled Public Safety UE" can utilize the proximity-based services, and supports the procedures in the proximity-based services as well as a specific capability for public safety. For example, the "ProSe-enabled Public Safety UE" transmits information for public safety through the proximity-based services. The information for public safety includes, for example, information on a disaster (such as an earthquake and a fire) and information used by a fire official or a police official.

The remote UE may be a UE that is located outside the network area (Out-of-Network). That is, the remote UE is located outside a coverage of the cell. The remote UE may be located within the coverage of the cell. Therefore, the remote UE may be a UE 100 to which a service is not directly provided by the E-UTRAN 10 (UE 100 which is not served by the E-UTRAN 10). The remote UE is provided with a ProSe relay service from the relay UE, as described later. A relay is executed between the remote UE that is provided with the ProSe relay service and the relay UE that provides the ProSe relay service.

The relay UE (ProSe UE-to Network Relay) provides functions to support connectivity of "Unicast" services for the remote UE. Therefore, the relay UE provides the ProSe relay service for the remote UE. Therefore, the relay UE can relay data (unicast traffic) between the remote UE and the network. The relay UE can relay data (traffic) of the remote UE through the proximity-based services (direct communication). Specifically, the relay UE can relay data (uplink traffic) received from the remote UE via the PC5 interface to the eNB 200 via a Uu interface (LTE-Uu) or a Un interface (LTE-Un). Further, the relay UE can relay data (downlink traffic) received from the eNB 200 via the Uu interface or the Un interface to the remote UE via the PC5 interface. The relay UE may be located only within the network (within the coverage of the cell).

The relay UE can provide a comprehensive function capable of relaying any type of traffic related to the communication for public safety.

The relay UE and the remote UE can transmit data and control signals between the physical layers. Similarly, the relay UE and the remote UE can transmit data and control signals between the MAC layers, between the RLC layers, and between the PDCP layers. In addition, the relay UE may have an IP-Relay layer as an upper layer of the PDCP layer. The remote UE may also have an IP layer as an upper layer of the PDCP layer. The relay UE and the remote UE can transmit data and control signals between the IP-Relay layer and the IP layer. Further, the relay UE can transmit data between the IP-Relay layer and the IP layer of an IP-GW 350.

In an AS layer (Access Stratum), the relay UE can transmit data (traffic) to the remote UE by broadcast. In the AS layer, the relay UE may transmit data to the remote UE by unicast. If the ProSec relay service is executed by broadcast, a feedback in a NAS layer (Non Access Stratum) may be performed between the relay UE and the remote UE, but a feedback in the AS layer is not performed. If the UE-Network relay is executed by unicast, the feedback in the AS layer may be performed.

Radio Terminal

Figure 5:
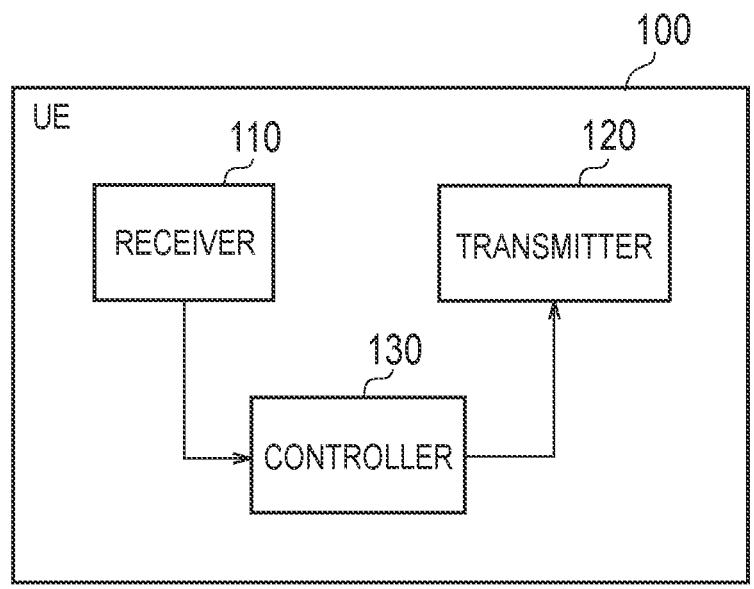
FIG. 5 is a block diagram of a UE 100.

The UE 100 (radio terminal) according to the embodiment will be described. FIG. 5 is a block diagram of the UE 100. As illustrated in FIG. 5, the UE 100 includes a receiver 110, a transmitter 120, and a controller 130. The receiver 110 and the transmitter 120 may be an integrated transceiver.

The receiver 110 performs various types of receptions under the control of the controller 130. The receiver 110 includes an antenna.

The receiver 110 converts a radio signal received by the antenna into a baseband signal (reception signal). The receiver 110 outputs the baseband signal to the controller 130.

The transmitter 120 performs various types of transmissions under the control of the controller 130. The transmitter 120 includes an antenna. The transmitter 120 converts the baseband signal (transmission signal) output from the controller 130 into a radio signal. The transmitter 130 transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor and a CPU (Central Processing Unit). The baseband processor performs, for example, modulation and demodulation, as well as coding and decoding, of the baseband signal. The CPU executes a program stored in the memory to perform various types of processes. The processor may include a codec configured to perform encoding and decoding on sound and video signals. The processor executes various types of processes described later, and various types of communication protocols described above.

The UE 100 may include a GNSS (Global Navigation Satellite System) receiver unit. The GNSS receiver unit can receive a GNSS signal to obtain location information indicating a geographical location of the UE 100. The GNSS receiver unit outputs the GNSS signal to the controller 130. The UE 100 may have a GPS (Global Positioning System) function for acquiring location information of the UE 100.

For simplicity, a process executed by at least any one of the receiver 110, the transmitter 120, and the controller 130 included in the UE 100 is described herein as a process (operation) executed by the UE 100.

Base Station

Figure 6:
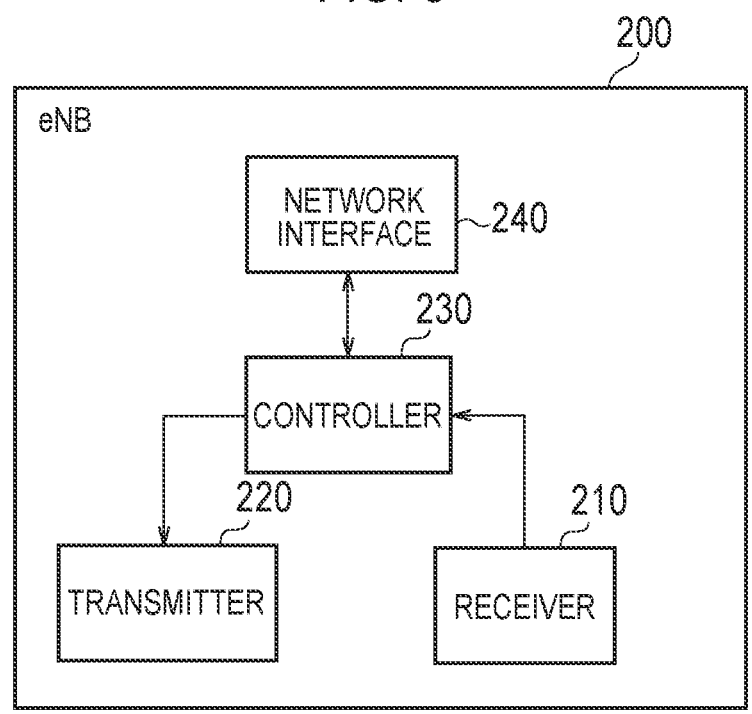
FIG. 6 is a block diagram of an eNB 200.

The eNB 200 (base station) according to the embodiment will be described. FIG. 6 is a block diagram of the eNB 200. As illustrated in FIG. 6, the eNB 200 includes a receiver 210, a transmitter 220, a controller 230, and a network interface 240. The transmitter 210 and the receiver 220 may be an integrated transceiver.

The receiver 210 performs various types of receptions under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmissions under the control of the controller 230. The transmitter 220 includes an antenna. The transmitter 220 converts the baseband signal (transmission signal) output from the controller 230 into a radio signal. The transmitter 220 transmits the radio signal by the antenna.

The controller 230 performs various types of controls in the eNB 200. The controller 230 includes a processor and a memory. The memory stores a program to be executed by the processor, and information to be used for a process by the processor. The processor includes a baseband processor and a CPU. The baseband processor performs modulation and demodulation, coding and decoding, and the like, of the baseband signal. The CPU executes a program stored in the memory to perform various types of processes. The processor executes various types of processes described later, and various types of communication protocols described above.

The network interface 240 is connected to an adjacent eNB 200 via the X2 interface. The network interface 240 is connected to the MME 300 and the SGW 400 via the S1 interface. The network interface 240 is used in communication performed on the X2 interface and communication performed on the S1 interface, for example. Further, the network interface 240 is used for communication with the HSS 500.

It is noted that for simplicity, a process executed by at least any one of the transmitter 210, the receiver 220, the controller 230, and the network interface 240 included in the eNB 200 is described herein as a process (operation) executed by the eNB 200.

First Embodiment

Figure 7:
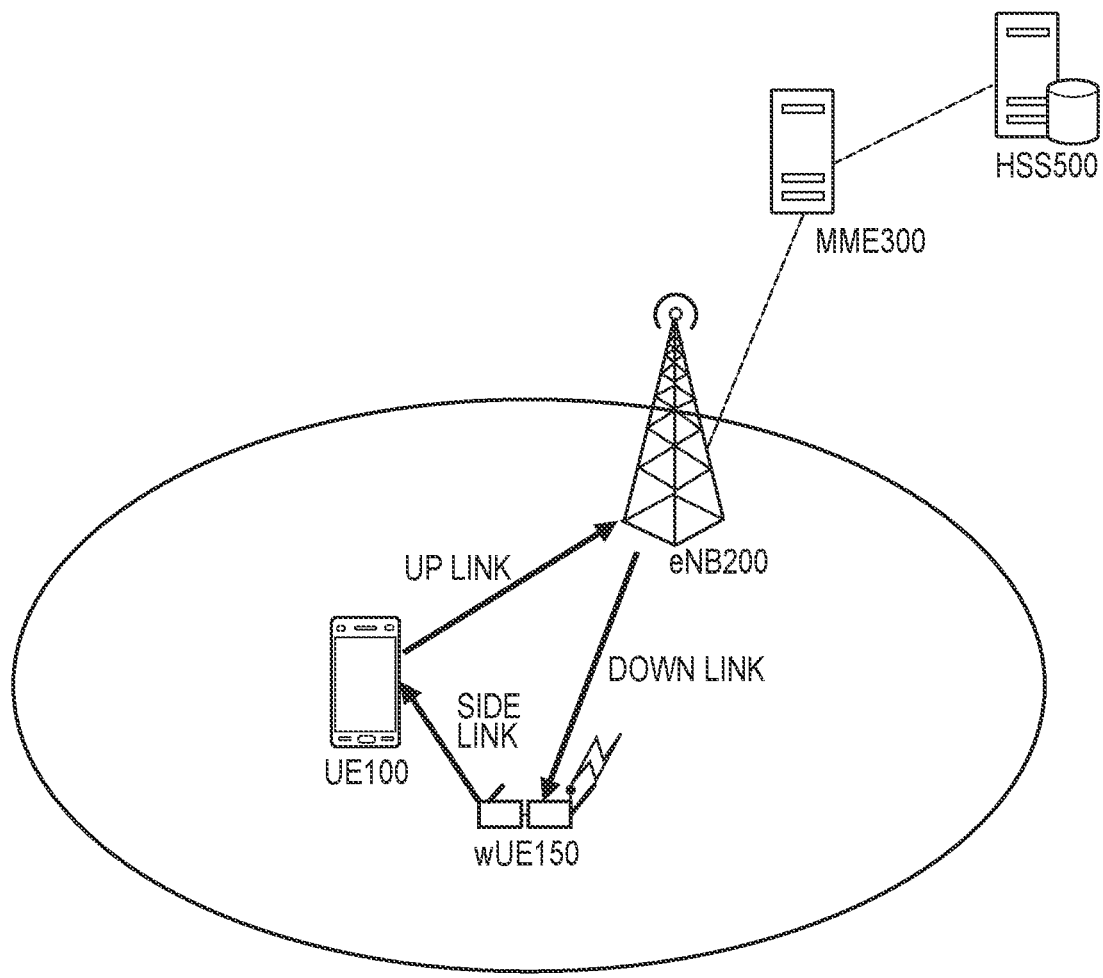
FIG. 7 is a diagram for describing an operation environment according to a first embodiment.
Figure 8:
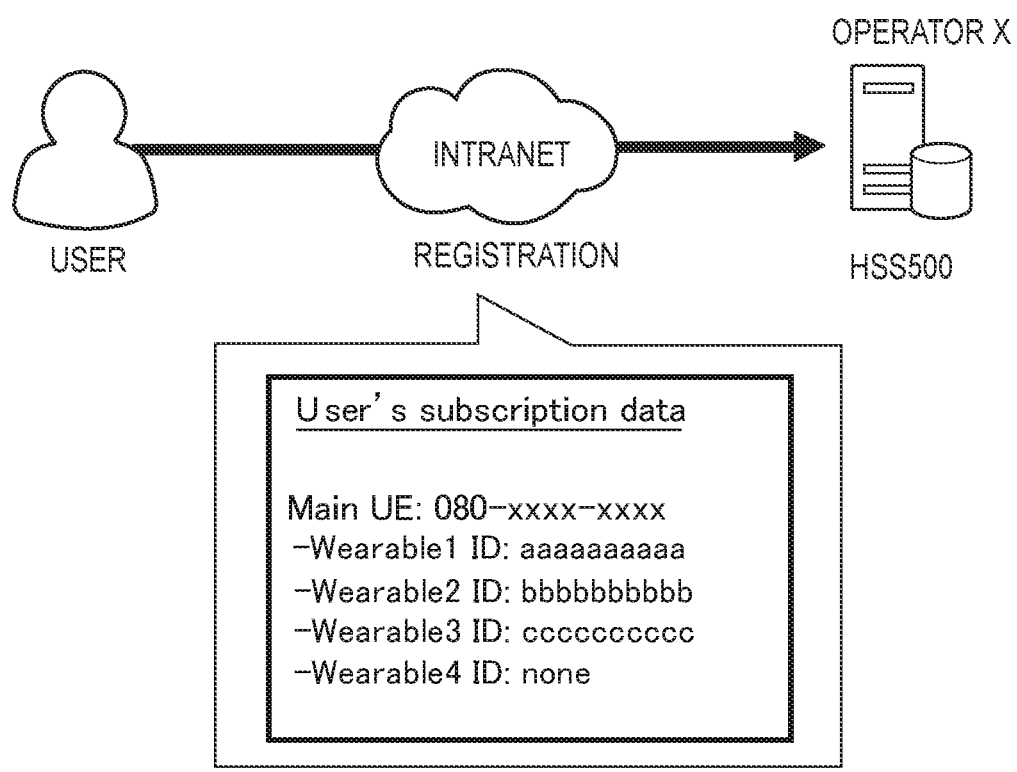
FIG. 8 is a diagram for describing an operation example according to the first embodiment.
Figure 9:
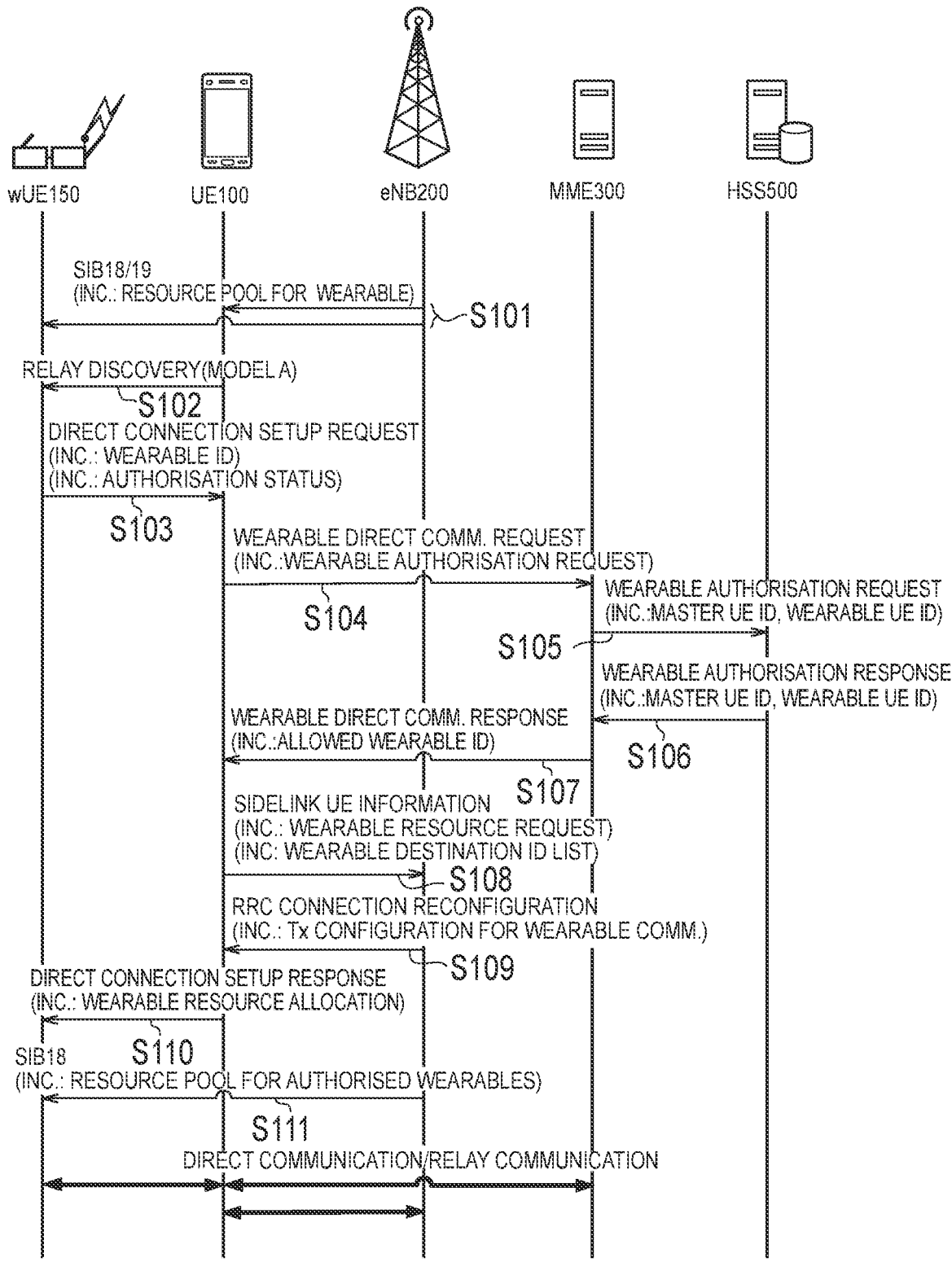
FIG. 9 is a sequence diagram for describing an operation according to the first embodiment.

A first embodiment will be described by using FIG. 7 to FIG. 9. FIG. 7 is a diagram for describing an operation environment according to the first embodiment. FIG. 8 is a diagram for describing an operation example according to the first embodiment. FIG. 9 is a sequence diagram for describing an operation according to the first embodiment.

As illustrated in FIG. 7, the UE 100 is located in a cell controlled by the eNB 200. The UE 100 is in the RRC connected state with the eNB 200 (cell). The UE 100 may be in the RRC idle state.

The UE 100 (the receiver 110, the transmitter 120, and the controller 130 included therein) can execute a cellular communication (transmission of an uplink signal and reception of a downlink signal) and a sidelink operation (transmission and/or reception of a sidelink signal). The sidelink signal may be at least one of a signal in the direct communication and a signal in the direct discovery. The sidelink signal may include a synchronization signal (SLSS: Sidelink Synchronization Signal) for synchronization in the sidelink. The sidelink signal may be a PC5 signal used for a control plane signal on the PC5.

A wUE 150 is located within the cell controlled by the eNB 200. The wUE 150 may be located outside the cell. The wUE 150 is in the RRC idle state with the eNB 200 (cell).

The wUE 150 (the receiver 110, the transmitter 120, and the controller 130 included therein) can be used to execute the sidelink operation. The wUE 150 can execute the reception of the downlink signal. The wUE 150 may or may not be configured to execute the transmission of the uplink signal. Therefore, the wUE 150 may not include the transmitter 120 for transmitting the uplink signal.

In the present embodiment, the wUE 150 is a wearable UE. That is, the wUE 150 is a user-wearable communication device. Because the UE 100 and the wUE 150 are carried by a user, the UE 100 and the wUE 150 are in a short range. With the movement of the user, the UE 100 and the wUE 150 both move while maintaining the short range.

The wUE 150 may be a short-range device. Therefore, the wUE 150 may be a communication device in which it is assumed that the sidelink operation is executed in a short range (within a range of several meters (for example, 2 m)).

In the present specification, the "short range" may be defined as a communicable distance (for example, a range of several meters). For example, the maximum reachable distance (maximum reachable range) of the sidelink signal between short-range devices (UE-wUE/wUE-wUE) is shorter than the maximum reachable distance of the sidelink signal between normal UEs (UE-UE). The maximum reachable distance of the sidelink signal between the short-range devices is shorter than the maximum reachable distance of the uplink signal between a UE and an eNB, as a matter of course.

The "short range" may be defined as a (maximum) transmission power (for example, a maximum transmission power of 0 dBm or less) of the sidelink signal. For example, the maximum transmission power of the sidelink signal between short-range devices (UE-wUE/wUE-wUE) is smaller than the maximum transmission power of the sidelink signal between normal UEs (UE-UE). The maximum transmission power of the sidelink signal between short-range devices is smaller than the maximum transmission power of the uplink signal between a UE and an eNB, as a matter of course.

The "short range" may be defined by conditions (settings) for using a W resource pool, which is described later.

Unlike the existing UE 100, the wUE 150 may not require mounting of an existing SIM (Subscriber Identity Module Card). A SIM for short range (D2D SIM) may be mountable in the wUE 150.

As illustrated in FIG. 8, a user who owns the UE 100 (Main UE) and the wUE 150 (Wearable UE) may register, to the network, a UE (wUE 150) associated with a UE 100 that has a contract with an operator, as user information. The user may register the UE associated with the UE 100 by using the UE 100. The user may register the UE associated with the UE 100 by using another terminal. The user may associate a plurality of UEs (wUEs 150) with the UE 100.

The user may register, as an identifier of the wUE 150 (Wearable ID), a MAC address and/or an IMEI (International Mobile Equipment Identity), for example.

The operator manages information (identifier) on the registered wUE 150 through the HSS 500, as subscriber information of the UE 100. The operator may manage information on a wUE 150 registered by a network apparatus other than the HSS 500. The identifier of the UE 100 (Master UE ID) and the identifier of the wUE 150 (Wearable ID) may be associated with each other.

A ProSe UE ID and/or an application code may be allocated to each wUE 150. A ProSe Group ID may be allocated to the UE 100 and the wUE 150. A ProSe UE ID and/or a Relay UE ID may be allocated to the UE 100.

The HSS 500 may manage information on the validity period of registration information. The registration information may include not only the identifier of the wUE 150 but also an allocated identifier.

An operation of the first embodiment will be described. As illustrated in FIG. 9, in step S101, the eNB 200 (cell) can provide (transmit) a resource pool available in a sidelink by using a SIB (System Information Block 18 and/or 19). That resource pool includes a resource pool available only between short-range devices (Resource pool for Wearables) in the sidelink. That resource pool may include a normal resource pool available between devices.

The resource pool available only between short-range devices in the sidelink is referred to as a W resource pool. The W resource pool includes a radio resource used for transmission and/or reception. Therefore, in the W resource pool, the radio resource used for transmission and/or reception is arranged. The W resource pool may include a resource pool for the direct communication. The W resource pool may include a resource pool for the direct discovery. The W resource pool may include a resource pool for synchronization in the sidelink. The W resource pool may be a resource pool for a short-range device (for example, a wearable UE). As in the present embodiment, the W resource pool may be not a resource pool available only in a short-range wUE 150 but a resource pool available also in a UE 100 that can communicate (relay) with the wUE 150.

The (maximum) transmission power in the W resource pool may be set to be lower than the transmission power used in a normal radio resource (resource pool). The normal radio resource (resource pool) refers to a radio resource (resource pool) used between normal devices (devices different from wearable UEs). The transmission power using the W resource pool may be set to be below a threshold indicating a value lower than a normal transmission power. Accordingly, the UE 100 and the wUE 150, when using the W resource pool, transmits a sidelink signal at a lower transmission power than in the case of using the normal resource pool. This makes it possible to reduce interference to the eNB 200.

The eNB 200 may transmit setting information of the transmission power together with the W resource pool. The W resource pool may be associated with an identifier indicating the W resource pool. Alternatively, the UE 100 may determine that it is a W resource pool by using information on a transmission power associated with a resource pool. The settings for the transmission power may be conditions (settings) for using the W resource pool. That is, the "short range" may be defined by the settings for the transmission power.

The UE 100 (and the wUE 150) may calculate a transmission power in the W resource pool without taking into account a value of path loss between an eNB and a UE. For example, the UE 100 may calculate the transmission power in the W resource pool, based on not a value of path loss between an eNB and a UE but a value of path loss between UEs. Therefore, the W resource pool may be a resource pool in which the transmission power is calculated based on the value of path loss between UEs. For example, the UE 100 may calculate a transmission power in the W resource pool, based on the received power and/or the reception quality of a sidelink signal (a synchronization signal, a discovery message, or the like). Specifically, in order to calculate the transmission power, the UE 100 may use a reception level (a received strength (S-RSRP) and a reception quality (S-RSRQ)) of the reference signal in the RB (resource block) in which the PSBCH is transmitted. In order to calculate the transmission power, the UE 100 may use the reception level (the received strength (SD-RSRP) and the reception quality (SD-RSRQ)) of the reference signal in the RB in which the PSDCH is transmitted. A method for calculating the transmission power may be conditions (settings) that the W resource pool can be used. That is, the "short range" may be defined by the method for calculating the transmission power.

The W resource pool may be an available resource pool, regardless of a state of reception of a radio signal (reference signal) from the eNB 200. That is, the W resource pool may be an available resource pool, regardless of the distance from the eNB 200. Accordingly, the W resource pool may not be set with a threshold to be compared with a reception level (for example, the received power: RSRP (Reference Signal Receive Power) and/or the received quality: RSRQ (Reference Signal Received Quality)) of the received signal from the eNB 200 (cell). Therefore, the UE 100 (and the wUE 150) may be configured to select a W resource pool, regardless of the state of reception of the radio signal (reference signal) from the eNB 200. For example, the UE 100 (and the wUE 150) may select a W resource pool based on the received power and/or the reception quality of a sidelink signal (a synchronization signal, a discovery message, or the like). Specifically, in order to select the W resource pool, the UE 100 may use a reception level (a received strength (S-RSRP) and a reception quality (S-RSRQ)) of the reference signal in the RB (resource block) in which the PSBCH is transmitted. In order to select the W resource pool, the UE 100 may use the reception level (the received strength (SD-RSRP) and the reception quality (SD-RSRQ)) of the reference signal in the RB in which the PSDCH is transmitted. The UE 100 usually selects a resource pool to be used, based on the RSRP of the received signal from the eNB 200. A method for selecting the transmission power may be conditions (settings) for using the W resource pool. That is, the "short range" may be defined by the method for selecting the transmission power.

When executing at least one of transmission or reception of the sidelink signal to or from a short-range communication device, the UE 100 and the wUE 150 may use the W resource pool in preference to the normal resource pool. The wUE 150, even if not authorised on the network, may use the W resource pool. The wUE 150, only if not authorised on the network, may use the W resource pool.

The UE 100 and the wUE 150 receive the SIB from the eNB 200 (cell) and thus acquire information on the W resource pool.

It is noted that in an initial state, a direct link used in the sidelink is not established between the UE 100 and the wUE 150.

In step S102, the UE 100 can transmit a discovery message for the ProSe relay. The UE 100 may transmit the discovery message by using the W resource pool. The W resource pool may be a resource pool for discovery for the ProSe relay.

In step S103, the wUE 150 transmits, to the UE 100, a first request message (Direct Connection Setup Request/Direct Connection Request) for establishing a direct link used in the sidelink. The wUE 150 may transmit the first request message to the UE 100 by using the W resource pool. The wUE 150 may transmit the first request message by PC5 signaling.

The wUE 150 may transmit the first request message in response to receiving the discovery message from the UE 100. Alternatively, the wUE 150 may transmit the first request message without receiving (before receiving) the discovery message from the UE 100. If the identifier of the UE 100 is registered in the wUE 150 (memory of the wUE 150), the wUE 150 may transmit the first request message without receiving the discovery message from the UE 100. The wUE 150 may include, in the first request message, as the identifier of the UE 100, an identifier (ProSe UE ID and/or Relay UE ID) of the UE 100 allocated on the network when the registration described above is performed.

The first request message includes the identifier (Wearable ID) of the wUE 150. The identifier of the wUE 150 may be an identifier of the wUE 150 that has been registered in the UE 100. The identifier of the wUE 150 may be an identifier that is registered in the HSS 500 in advance as described above (for example, IMEI, MAC address, and the like). The identifier of the wUE 150 may be an identifier agreed in advance with the UE 100. The first request message may include an identifier (ProSe UE ID) of the wUE 150 allocated on the network when the registration described above is performed. The first request message may include a Prose Group ID. If the first request message includes an identifier allocated when the registration described above is performed, the UE 100 may determine that the wUE 150 which is the transmission source is associated with the UE 100.

The first request message may include information indicating that the wUE 150 is associated with the UE 100. For example, that information may be included in "Userinfo" in the first request message.

The wUE 150, if not authorized on the network, may include, in the first request message, information (Authorization status) indicating that the wUE 150 is not authorised on the network. That information may be information indicating the type of message (for example, "non-authorised_DIRECT_COMMUNICATION_REQUEST" added to "PC5-SP Message Type"). That information may be included in "UserInfo" in the first request message. That information may be a new IE indicating that the wUE 150 is not authorised on the network.

If the identifier of the UE 100 has been registered in the UE 100, the UE 100 can start an operation for establishing a direct link. If the wUE 150 is associated with the UE 100 through the registration on the network, the UE 100 may start the operation.

Specifically, the UE 100 may execute the process of step S104. The UE 100 may execute the process of step S108, without executing the process of step S104. Only if the wUE 150 is not authorised on the network, the UE 100 may execute the process of step S104. Therefore, if the first request message includes information indicating that the wUE 150 is not authorised on the network, the UE 100 may execute the process of step S104. The UE 100 may execute the process of step S109, without executing the processes of step S104 and step S108.

In step S104, the UE 100 transmits a second request message (Wearabel Direct Comm.Request) to the MME 300. The UE 100 may transmit the second request message by using a NAS message to the MME 300.

The second request message is a message for requesting a direct communication with the wUE 150. The second request message may be a message for inquiring whether a direct communication with the wUE 150 can be executed. The second request message may be a message (Wearable Authorisaztion Request) for requesting authorisation for the wUE 150 on the network.

The UE 100, when executing the ProSe relay for the wUE 150, may transmit, as the second request message, a remote UE report message including the identifier of the wUE 150 to the MME 300. The remote UE report message may be a message for a PDN connection associated with the relay. In this case, the identifier of the wUE 150 is included in that message as an identifier of the remote UE.

The second request message may include at least a part of information included in the first request message (for example, information on the wUE 150). The second request message includes information on the UE 100 (for example, the identifier of the UE 100). The second request message may include an identifier allocated on the network.

When receiving the first request message from respective wUEs 150 within a predetermined time period, the UE 100 may transmit, to the MME 300, a single second request message including information (list) on the respective wUEs 150. As a result, it is possible to reduce the signaling.

In step S105, the MME 300 transmits an inquiry message (Wearable Authorisaztion Request) to the HSS 500 in response to receiving the second request message.

The inquiry message includes the identifier of the UE 100 (Master UE ID) and the identifier of the wUE 150 (Wearable ID). The inquiry message may include at least a part of information included in the second request message.

The HSS 500 checks whether the wUE 150 is registered in the user information of the UE 100 in response to receiving the inquiry message.

In step S106, the HSS 500 transmits a response message (Wearable Authorisaztion Response) to the inquiry message to the MME 300.

If the wUE 150 is registered in the user information of the UE 100, the HSS 500 authorises the wUE 100. That is, the HSS 500 transmits the response message indicating that the direct communication is allowed (to enable the direct communication to be executed). If the wUE 150 is not registered in the user information of the UE 100, the HSS 500 does not authorise the wUE 100. That is, the HSS 500 transmits the response message indicating that the direct communication is not allowed (disable the direct communication to be executed).

The response message includes the identifier of the UE 100 (Master UE ID) and the identifier of the wUE 150 (Wearable ID). The response message may include at least a part of information included in the inquiry message.

In step S107, the MME 300 transmits a response message (Wearable Direct Comm.Response) to the second request message to the UE 100 in response to receiving the response message from the HSS 500.

If the response message from the HSS 500 indicates that the direct communication is allowed, the MME 300 transmits a response message to allow the direct communication between the UE 100 and the wUE 150 to the UE 100. If the response message from the HSS 500 indicates that the direct communication is not allowed, the MME 300 transmits a response message not to allow the direct communication between the UE 100 and the wUE 150 to the UE 100.

The response message may include an identifier of the wUE 150 (Allowed Wearable ID) for which the direct communication is allowed.

In step S108, the UE 100 transmits a sidelink UE information (Sidelink UE information) message to the eNB 200. The UE 100 may transmit the sidelink UE information message in response to receiving the response message to allow the direct communication.

The UE 100 may request, by using the sidelink UE information message, a radio resource for direct communication with a short-range communication device (for example, wearable UE) or a radio resource (Wearable resource request) for short-range communication.

The sidelink UE information message may include a destination ID list (Wearable Destination ID List) for a short-range communication device (for example, wearable UE). If it includes the destination ID list for the short-range communication device, the eNB 200 may determine that the UE 100 is interested in the direct communication with the short-range communication device (for example, wearable UE) or the short-range communication.

The UE 100 may execute the process of step S110, without executing the process of step S108.

In step S109, the eNB 200 can allocate information on the radio resource for short-range communication to the UE 100 (and the wUE 150). The eNB 200 may transmit the information on the radio resource to the UE 100 by using an RRC message (for example, RRC Connection Reconfiguration).

The information on the radio resource may include a radio resource used by the wUE 150. The information on the radio resource may include information on a resource pool available in a short-range communication device for which the direct communication is allowed. The information on the radio resource may be information on a radio resource in step S111.

The eNB 200 may allocate information on a transmission power (Tx configuration for Wearable Comm.) together with the information on the radio resource. Here, the (maximum) transmission power indicated by that information is a transmission power lower than that in the case of using a radio resource available between normal devices.

In step S110, the UE 100 can transmit a response message (Direct Connection Setup Response/Direct Connection Response) to the first request message to the wUE 150.

The response message may include information on the radio resource used in step S109. That is, the response message may include the radio resource (transmission and/or reception resource (pool)) used by the wUE 150.

The response message may include information for establishing a direct link.

In step S111, the eNB 200 may transmit information on the radio resource used by the wUE 150 by using an SIB. The information on the radio resource is, for example, information on the transmission and/or reception resource pool.

The UE 100 and the wUE 150 establish the direct link. The direct link is established between the UE 100 and the wUE 150. The UE 100 and the wUE 150 execute at least one of transmission and reception of a sidelink signal via the direct link. Specifically, the UE 100 and the wUE 150 execute a direct communication by using a resource pool for short range. Further, the UE 100 executes the ProSe relay between the wUE 150 and an NW. Therefore, when performing transmission of data (packet) to the network, the wUE 150 can transmit the data through the UE 100.

The UE 100 and the wUE 150 make it possible to execute the direct communication (ProSe relay) at a lower transmission power than normal because they are in a short range. Therefore, even if a resource pool (resource pool for short range) in which a transmission power is limited to be lower than normal is used, an adequate communication between the UE 100 and the wUE 150 is possible. As a result, it is possible to reduce interference to the cellular communication. Further, it is possible to achieve power saving in the wUE 150 (and the UE 100).

Second Embodiment

Figure 10:
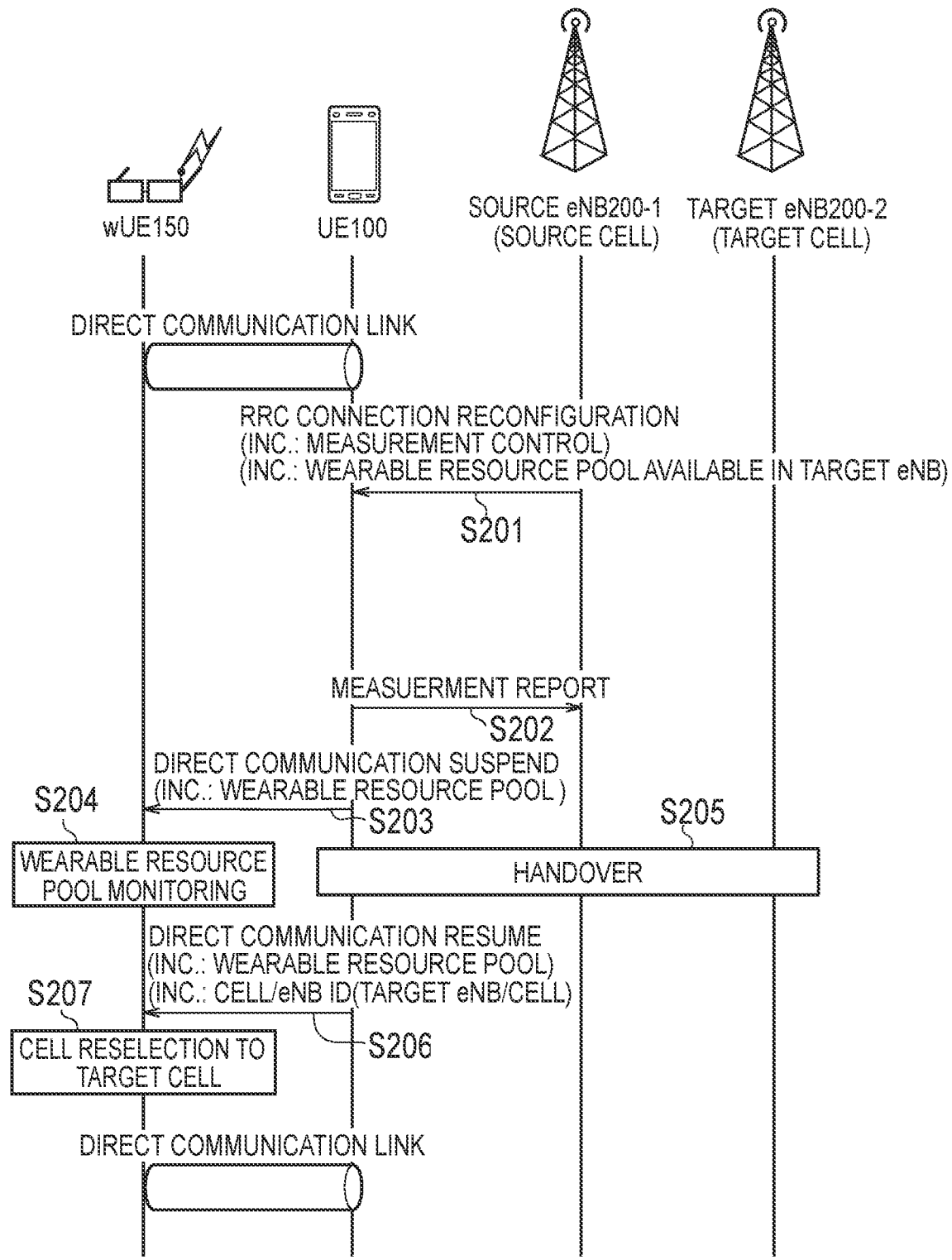
FIG. 10 is a sequence diagram for describing an operation according to a second embodiment.

A second embodiment will be described by using FIG. 10. FIG. 10 is a sequence diagram for describing an operation according to the second embodiment. It will be described focusing on differences from the first embodiment.

In the first embodiment, the direct link is established from the state in which no direct link is established between the UE 100 and the wUE 150.

In the second embodiment, as illustrated in FIG. 10, a direct link has already been established between the UE 100 and the wUE 150 in an initial state. The UE 100 and the wUE 150 execute a direct communication via the direct link (for example, Direct Communication Link or ProSe UE-to-NW Relay Link). The UE 100 may relay data (packet) of the wUE 150 between the wUE 150 and the network. The direct link may be established as in the first embodiment described above or may be established by other methods.

The UE 100 and the wUE 150 are located in a source cell controlled by an eNB 200-1 (Source eNB 200-1). The UE 100 is in the RRC connected state with the eNB 200-1 (source cell). The wUE 150 camps in the source cell. The source cell is a serving cell (Primary Cell) for the UE 100. The source cell is a cell selected by the wUE 150 through cell selection (reselection).

An eNB 200-2 (Target eNB 200-2) is adjacent to the eNB 200-1. The eNB 200-2 controls a target cell. The source cell is a neighboring cell of the target cell.

In the following, it is assumed that the UE 100 and the wUE 150 move toward the target cell with the movement of the user.

In step S201, the eNB 200-1 transmits a message (for example, RRC Connection Reconfiguration) to the UE 100. That message may include measurement setting information (Control Measurement) for a measurement report that is to be transmitted by the UE 100. The UE 100 transmits the measurement report based on the measurement setting information.

That message may include information on a W resource pool available in a neighbour eNB 200 (Wearable Resource pool available in TeNB). That information on the W resource pool is a resource pool provided by the neighbour eNB 200 (neighbouring cell). In the present embodiment, that message includes information on the W resource pool available in the eNB 200-2 (target cell).

The UE 100 determines that the eNB 200-2 provides the W resource pool, based on the information on the W resource pool included in that message.

In step S202, the UE 100 can transmit the measurement report to the eNB 200-1 (source cell), based on the measurement setting information.

In step S203, the UE 100 can transmit a suspension message (Direct Communication Suspend) to the wUE 150. The UE 100 may transmit the suspension message to the wUE 150 before executing a handover.

The UE 100 may transmit the suspension message to the wUE 150 in response to transmitting the measurement report to the eNB 200-1 (source cell). That is, the UE 100 may transmit the suspension message with the start of transmission of the measurement report as a trigger. For example, the UE 100 may transmit the suspension message after transmitting the measurement report. The UE 100 may transmit the suspension message before transmitting the measurement report.

The UE 100 may receive a threshold from the eNB 200-1 (source cell) by individual signaling (for example, the RRC reconfiguration message in step S201) or common signaling (for example, SIB). The threshold is compared with a reception level (for example, received power: RSRP (Reference Signal Receive Power) and/or received quality: RSRQ (Reference Signal Received Quality)) of the received signal from the eNB 200-1 (source cell) and/or the eNB 200-2 (target cell). The UE 100 may transmit the suspension message in response to the reception level, of the received signal from the eNB 200-1 (source cell), reaching the threshold (falling below the threshold). The UE 100 may transmit the suspension message in response to the reception level, of the received signal from the eNB 200-2 (target cell), reaching the threshold (exceeding the threshold).

The suspension message is a message for suspending the direct communication via the direct link.

The suspension message may include a resource pool (Wearable Resource pool) used for transmitting (receiving) a resumption message described later or a release message described later. That resource pool may be a resource pool used only while the direct communication is suspended. That resource pool may be a W resource pool. Like the above description, the W resource pool may be used only at low transmission power.

The suspension message may include information on a timer for measuring a period when the suspension of the direct communication is enabled. The UE 100 may transmit the information on the timer to the wUE 150 by using another message. When the timer expires before the wUE 150 receives a sidelink signal (for example, PC5 signaling, the resumption message described later) from the UE 100, the wUE 150 may release the direct link.

The wUE 150 may stop execution of the cell reselection in response to receiving the suspension message. If the suspension message includes an instruction to stop execution of the cell reselection, the wUE 150 may stop execution of the cell reselection. This makes it possible to avoid selecting a different cell from the target cell of the UE 100.

When the reception level (such as RSRP and/or RSRQ) of the received signal from the source cell (and the neighbouring cell (target cell)) falls below the threshold, the wUE 150 may transmit, to the UE 100, a confirmation message (Direct Communication Suspend Request) to confirm whether to suspend the direct communication. When not receiving the suspension message from the UE 100, the wUE 150 may transmit the confirmation message. The confirmation message may be a message for requesting suspension (message) of the direct communication. That threshold may be information received from the eNB 200-1 (source cell) or the UE 100.

The wUE 150 may stop execution of the cell reselection in response to transmitting the confirmation message. This makes it possible to avoid selecting a different cell from the target cell of the UE 100. The confirmation message may include information indicating that the wUE 150 has stopped execution of the cell reselection.

The UE 100 may determine whether to transmit the suspension message to the wUE 150 in response to receiving the confirmation message. The UE 100 may determine that with taking into account the reception level (such as RSRP and/or RSRQ) of the received signal from the eNB 200-1 (source cell) and/or the eNB 200-2 (target cell). The UE 100 may determine that with taking into account the movement speed of the UE 100. The UE 100 may transmit the suspension message to the wUE 150 as a response to the confirmation message. The UE 100 may transmit, to the wUE 150, a message indicating that the direct communication is not suspended (the direct communication is continued).

The UE 100 suspends the direct communication in response to transmitting the suspension message. Further, the wUE 150 suspends the direct communication in response to receiving the suspension message.

In step S204, the wUE 150 executes monitoring. A resource pool used for monitoring may be a W resource pool. The wUE 150 may execute monitoring using the W resource pool included in the suspension message. The wUE 150 may continue to use the W resource pool used before receiving the suspension message, that is, the W resource pool used before a handover of the UE 100 is executed. The wUE 150 may execute monitoring in the W resource pool that was used for the direct communication via the direct link with the UE 100. If continuing to use the W resource pool, the wUE 150 uses the W resource pool only for monitoring. That is, the wUE 150 does not transmit a sidelink signal (Communication signal) by using the W resource pool.

In step S205, the UE 100 executes a handover process. Specifically, a handover from the source cell (eNB 200-1) to the target cell (eNB 200-2) is executed.

In the present embodiment, the UE 100 executes the handover without releasing the direct link. When the target cell (eNB 200-2) provides the W resource pool, the UE 100 can execute the handover without releasing the direct link. Thus, after the handover is executed, the UE 100 and the wUE 150 can resume the direct communication.

When the process of step S203 is not executed, the UE 100 may transmit a suspension message to the wUE 150 in response to receiving a message (HO command) for executing the handover from the source cell (eNB 200-1). Specifically, when receiving the message (HO command) including an instruction (mobility Control Information) to execute the handover from the eNB 200, the UE 100 may execute the process of step S203. The suspension message may include an identifier of the target cell (and/or identifier of eNB 200-2) that is the target of the handover. The wUE 150 may execute the cell reselection based on that identifier, as described later.

The HO command may include information for determining whether to maintain the direct link. For example, the HO command may include information indicating that the W resource pool has been provided in eNB 200-2 (target cell). The HO command may include information indicating whether a direct communication with a short-range device is allowed in the eNB 200-2 (target cell). The UE 100 may determine whether to execute the process of step S203 based on that HO command. When determining that the direct link can be maintained, the UE 100 may transmit a suspension message to the wUE 150. For example, when the HO command includes information indicating that the W resource pool has been provided in the eNB 200-2 (target cell), the UE 100 may transmit the suspension message. When the HO command includes information indicating that a direct communication with a short-range device in the eNB 200-2 (target cell) is allowed, the UE 100 may transmit the suspension message.

When determining that the direct link can not be maintained, the UE 100 may transmit a release message described later to the wUE 150. Even when transmitting the suspension message, the UE 100 may transmit the release message.

In step S206, the UE 100 can transmit a message to the wUE 150 depending on whether the handover is successful or not. When the handover is successful, the UE 100 can transmit the resumption message (Direct Communication Resume) to the wUE 150. When the handover is unsuccessful, the UE 100 can transmit the release message (Direct Communication Release) to the wUE 150.

The UE 100 may transmit the resumption message or the release message by using the W resource pool included in the suspension message. The UE 100 may transmit the resumption message or the release message by using the W resource pool that was used before the handover is executed. The UE 100 can transmit the resumption message or the release message by PC5 signaling.

The resumption message is a message for resuming the direct communication. The wUE 150, when receiving the resumption message, resumes the direct communication. The release message is a message for releasing the direct link.

The resumption message may include a W resource pool (Wearable Resource pool) available in the target cell. The resumption message may include an identifier of the handover target (the identifier of the target cell (Cell ID) and/or the identifier of the eNB 200-2 (eNB ID)). The UE 100 may transmit the identifier of the handover target (Cell ID/eNB ID) through group transmission including the group identifier (ProSe Group ID) that is allocated in advance as described in the first embodiment. The UE 100 may transmit the Cell ID/eNB ID separately from the resumption message.

The wUE 150, when receiving the release message, releases the direct link. The UE 100, when transmitting the release message, releases the direct link. The UE 100 and the wUE 150 may establish a new direct link. The release message may include information for establishing a new direct link. The release message may include the identifier of the handover target (Cell ID/eNB ID).

In step S207, the wUE 150 executes the cell reselection. The wUE 150 selects a cell to be camped based on the identifier of the handover target from the UE 100. Specifically, the wUE 150 executes the cell reselection to the target cell as the cell with the highest priority. This makes it possible to make the wUE 150 camp in the target cell of the UE 100.

The wUE 150 may start execution of the cell reselection in response to receiving the identifier of the handover target. The wUE 150 may stop execution of the cell reselection until the wUE 150 receives the identifier of handover target. The wUE 150 may start execution of the cell reselection in response to receiving the resumption message. The wUE 150 may stop execution of the cell reselection until the wUE 150 receives the resumption message.

After selecting the target cell, the wUE 150 resumes the direct communication with the UE 100 by using the W resource pool provided in the target cell. Because the direct link is maintained without being released before and after the handover, the operation for establishing the direct link in the target cell can be eliminated. As a result, the UE 100 and the wUE 150 can start (resume) the direct communication immediately.

Modification of Second Embodiment

Figure 11:
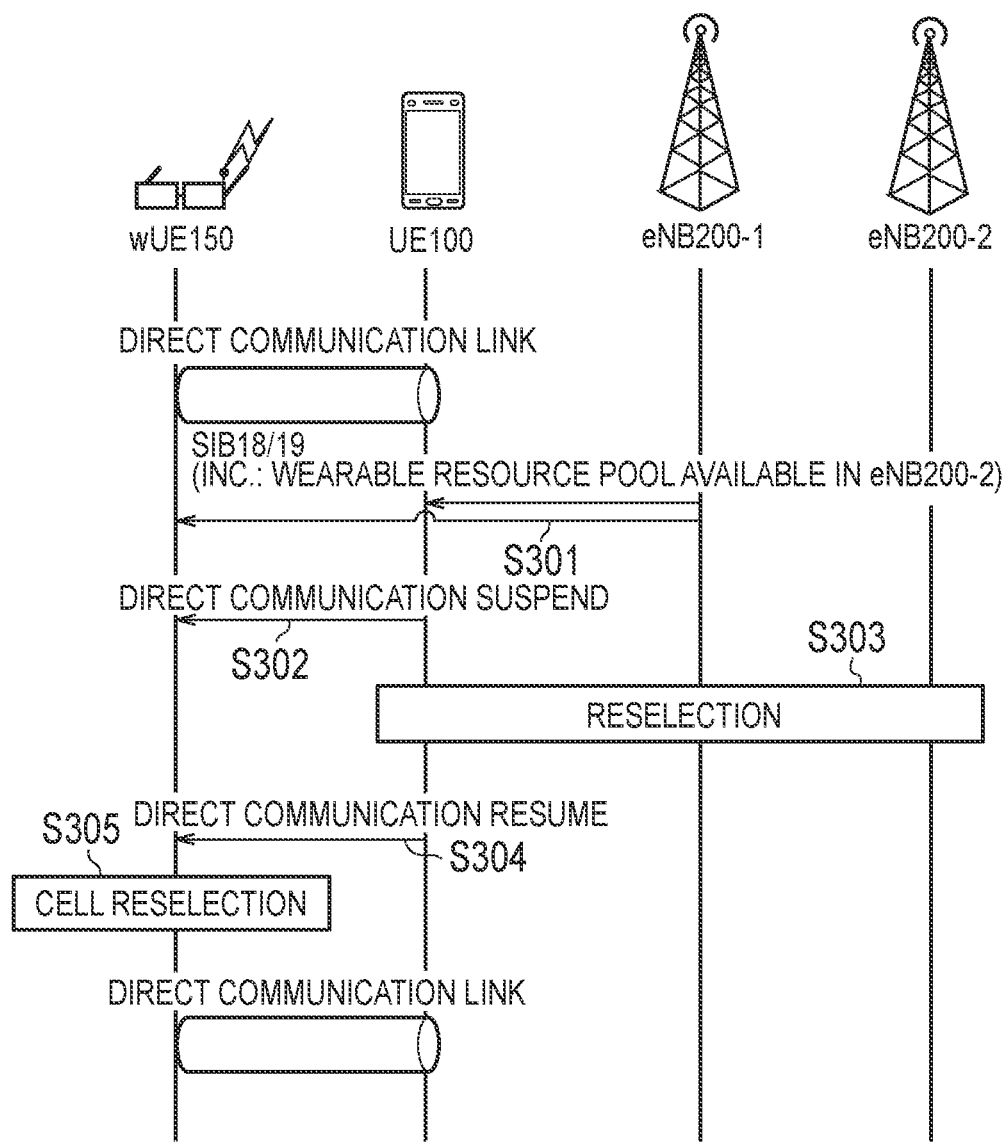
FIG. 11 is a sequence diagram for describing an operation according to a modification of the second embodiment.
Figure 12:
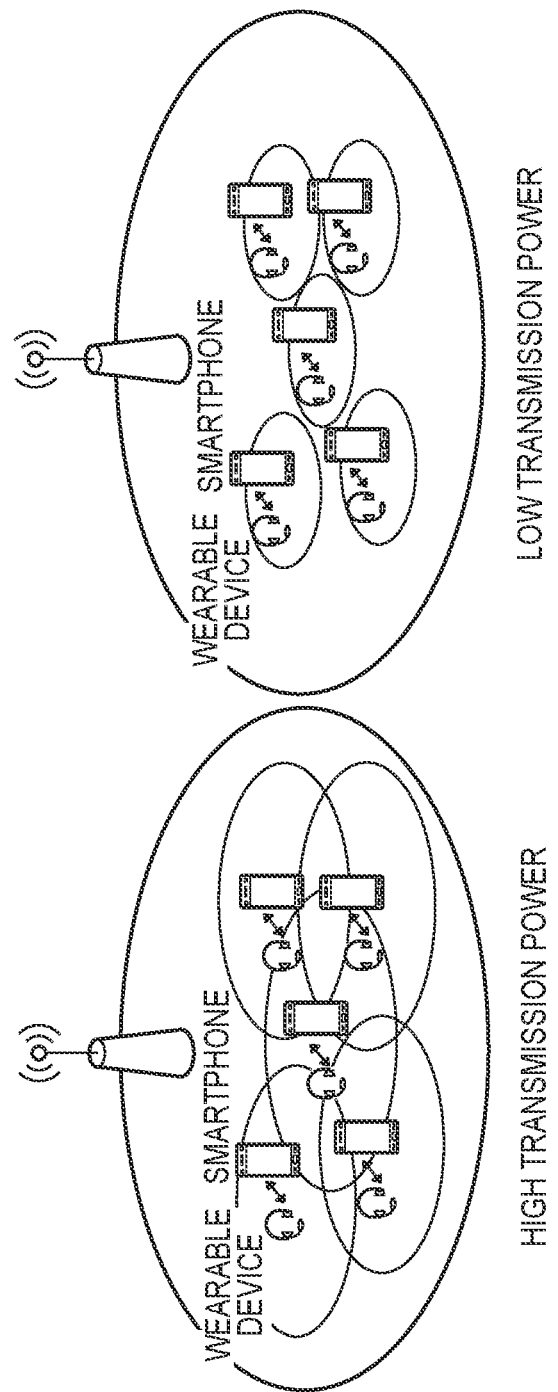
FIG. 12 is a diagram according to supplementary note.
Figure 13:
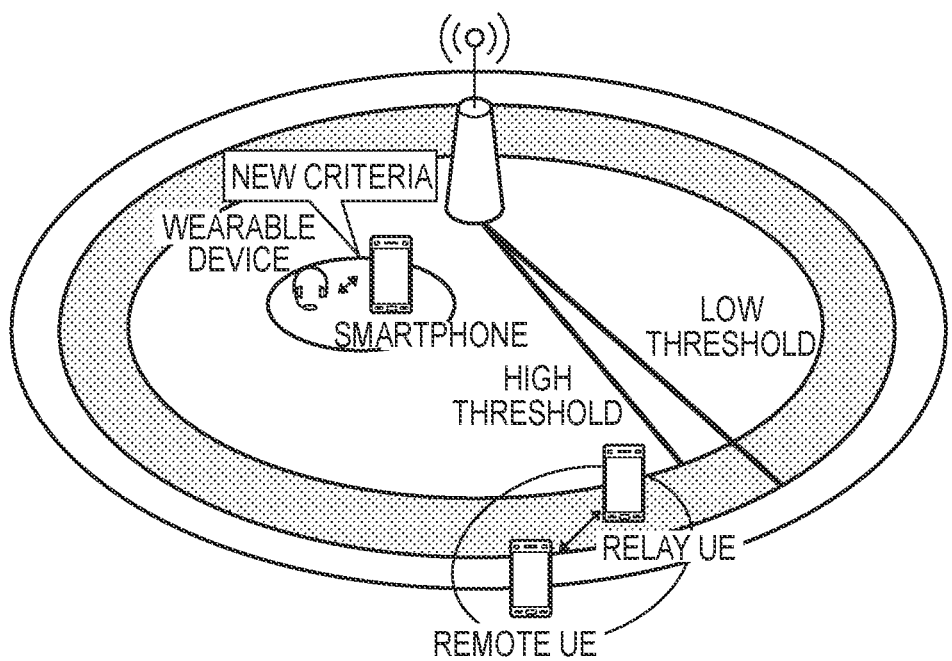
FIG. 13 is a diagram according to supplementary note.

A modification of the second embodiment will be described by using FIG. 11. FIG. 11 is a sequence diagram for describing the operation according to the modification of the second embodiment. It will be described focusing on differences from the second embodiment.

In the present modification, the UE 100 is in the RRC idle state.

As illustrated in FIG. 11, in step S301, the eNB 200-1 provides (transmits) a W resource pool provided by a neighbour eNB 200 (neighboring cell) by using an SIB (SIB 18 and/or 19). The UE 100 and the wUE 150 can receive the W resource pool from the eNB 200-1.

The UE 100 and the wUE 150 may acquire the W resource pool provided by the eNB 200-2 by reading the SIB provided by the eNB 200-2 (neighboring cell) that is the neighbour eNB 200.

In step S302, the UE 100 can transmit a suspension message to the wUE 150. As in step S203, the UE 100 can transmit the suspension message to the wUE 150 by using a threshold, based on a reception level of the received signal from the eNB 200-1 and/or the eNB 200-2.

In step S303, the UE 100 executes the cell reselection. The UE 100 selects a cell of the eNB 200-2.

Steps S304 and S305 correspond to steps S206 and S207. The UE 100 and the wUE 150 can transmit and receive a resumption message by using the W resource pool in step S301.

As described above, the UE 100 and the wUE 150 can execute the cell selection (reselection) without releasing the direct link. As a result, the UE 100 and the wUE 150 can start (resume) the direct communication immediately.

Other Embodiments

The contents of the present application are described according to each of the above-described embodiments, but it should not be understood that the discussion and the drawings constituting a part of this disclosure limit the contents of the present application. From this disclosure, various alternative embodiments, examples, and operational technologies will become apparent to those skilled in the art.

In the second embodiment described above, an example with the direct communication is described; however, the direction communication may be replaced with a ProSe relay. Further, the direct communication may be replaced with another operation in the sidelink (for example, direct discovery).

Even when executing a handover (or cell reselection), the UE 100 may not transmit a suspension message. For example, if the eNB 200-1 (source cell) and the eNB 200-2 (target cell) provide the same W resource pool, the UE 100 may eliminate transmission of the suspension message. Even if the eNB 200-1 (source cell) and the eNB 200-2 (target cell) provide a different W resource pool, the UE 100 may eliminate transmission of the suspension message, when the W resource pool of the eNB 200-1 (source cell) and the W resource pool of the eNB 200-2 (target cell) are simultaneously used.

In each of the above-described embodiments, an example with the wearable UE is described; this is not limiting. For example, the above-described configuration may be applied to a communication device connected to the network in a mobile body (for example, a vehicle) and a UE (or an IoT (Internet of Things) device in the mobile body) in the mobile body. The above-described configuration may be applied to communication devices for machine type communication (MTC: Machine Type Communication) that is communication without human intervention.

The operation according to each of the above-described embodiments may be combined to be executed, where necessary. In each of the above-described sequences, all of the operations may not necessarily be an essential configuration. For example, in each sequence, only some of the operations may be executed.

Although not particularly mentioned in each of the above-described embodiments, a program for causing a computer to execute each process performed by any one of the above-described nodes (such as the UE 100 and the eNB 200) may be provided. The program may be recorded on a computer-readable medium. If the computer-readable medium is used, it is possible to install the program on a computer. Here, the computer-readable medium recording therein the program may be a non-transitory recording medium. The non-transitory recording medium may include, but not be limited to, a recording medium such as a CD-ROM and a DVD-ROM, for example.

Alternatively, a chip may be provided which includes: a memory for storing a program for performing each process performed by any one of the UE 100 and the eNB 200; and a processor for executing the program stored in the memory.

In the above-described embodiments, an LTE system is described as an example of the mobile communication system; however, the LTE system is not an exclusive example, and the content according to the present application may be applied to a system other than the LTE system.

Supplementary Note

1. Introduction

Wearable devices should be considered as following.

Study enhancements to UE-to-network relaying and to the LTE D2D framework for applications targeting wearables use cases.

This supplementary note investigates the ProSe scheme for wearable devices.

2. Discussion 2.1. Requirements for Wearable Devices

Direct Communication for Commercial Use

Currently, there are kinds of wearable devices in the market, and many of them are for commercial use. However, current ProSe Direct Communication is only for public safety use. it need to discuss whether or not ProSe Direct Communication for commercial use should be introduced from this release.

Proposal 1: It should discuss whether or not ProSe Direct Communication for commercial use should be introduced.

Low Transmission Power Operation

As mentioned in the several documents, long battery life is important for wearable devices. It can be assumed wearable devices, e.g. watches, glasses or etc, are close to the user's smartphone in the most cases, so if wearable devices perform ProSe Operation with low transmission power, wearable devices can suppress their power consumption. Additionally, low transmission power operation may reduce the interference with other devices and improve the spectrum efficiency.

Proposal 2: It should discuss whether or not low transmission power operation for wearable devices should be introduced.

ProSe UE-to-NW Relay for Wearable Devices

ProSe UE-to-NW Relay operation will be efficient for wearable devices, because wearable devices can transmit data via PC5 with lower power than via Uu. This motivation to use the ProSe UE-to-NW Relay operation is different from current motivation for ProSe UE-to-NW Relay, i.e., coverage enhancement, therefore, we should discuss whether or not the criteria to initiate the ProSe UE-to-NW Relay operation should be enhanced, i.e., whether or not the smartphone (Relay UE) and the wearable devices (Remote UEs) located near the serving cell should be allowed to perform ProSe UE-to-NW Relay. Additionally, as we mentioned above, wearable devices will be commercial use, so we also need to discuss whether ProSe UE-to-NW Relay operation for commercial use should be introduced or not.

Proposal 3: It should discuss whether or not ProSe UE-to-NW Relay for commercial use should be introduced.

Proposal 4: It should discuss whether or not the smartphone (Relay UE) and the wearable devices (Remote UEs) located near the serving cell should be allowed to perform ProSe UE-to-NW Relay.

INDUSTRIAL APPLICABILITY

The present disclosure is useful in the field of mobile communication.

The invention claimed is:

1. A communication method, the method comprising:
    establishing, by a first communication device, a direct link used in a sidelink with a second communication device that is a short-range communication device;
    executing, by the first communication device, a handover from a first cell to a second cell;
    executing, by the first communication device, the handover without releasing the direct link, when the second cell provides a specific resource pool available only between short-range devices within a plurality of resource pools available between devices in a sidelink; and
    transmitting, by the first communication device, a suspension message for suspending a direct communication through the direct link to the second communication device before executing the handover, wherein the suspension message is transmitted in response to transmitting a measurement report by the first communication device to the first cell or in response to receiving a message for executing a handover by the first communication device from the first cell.

2. The communication method according to claim 1, receiving, by the first communication device, a threshold from a first cell,
wherein the suspension message is transmitted by the first communication device in response to a reception level, of a received signal from the first cell and the second cell, reaching the threshold.

3. The communication method according to claim 2, further comprising:
receiving, by the first communication device, the threshold from the first cell.

4. The communication method according to claim 1, further comprising:
transmitting, by the first communication device, information on a timer for measuring a period when suspension of the direct communication is enabled to the second communication device; and
releasing, by the second communication device, the direct link in response to the timer expiring before a sidelink signal is received from the first communication device via the direct link.

5. The communication method according to claim 1, further comprising:
stopping, by the second communication device, execution of a cell reselection in response to receiving the suspension message.

6. The communication method according to claim 1, further comprising:
transmitting, by the first communication device, a resumption message for resuming the direct communication to the second communication device, when the handover is successful; and
transmitting, by the first communication device, a release message for releasing the direct link to the second communication device, when the handover is unsuccessful.

7. The communication method according to claim 6, further comprising:
transmitting, by the first communication device, the resumption message or the release message by using a resource pool that was used before the handover is executed.

8. The communication method according to claim 6, wherein
the suspension message includes a resource pool used for transmitting the resumption message or the release message.

9. The communication method according to claim 6, further comprising:
starting, by the second communication device, execution of a cell reselection in response to receiving the resumption message.

10. The communication method according to claim 1, further comprising:
transmitting, by the first communication device, an identifier of the second cell to the second communication device; and
selecting, by the second communication device, the second cell as a cell to be camped.

11. The communication method according to claim 10, further comprising:
starting, by the second communication device, execution of a cell reselection in response to receiving an identifier of the second cell from the first communication device.

12. A communication method, the method comprising:
establishing, by a first communication device, a direct link used in a sidelink with a second communication device that is a short-range communication device;
executing, by the first communication device, a handover from a first cell to a second cell;
executing, by the first communication device, the handover without releasing the direct link, when the second cell provides a specific resource pool available only between short-range devices within a plurality of resource pools available between devices in a sidelink;
transmitting, by the first communication device, a suspension message for suspending a direct communication through the direct link to the second communication device before executing the handover; and
transmitting, by the second communication device, a message for confirming whether to suspend the direct communication via the direct link to the first communication device, when a reception level of a received signal from the first cell falls below a threshold.

13. The communication method according to claim 12, further comprising:
transmitting, by the first communication device, the suspension message as a response to the confirmation message.

14. The communication method according to claim 12, further comprising:
stopping, by the second communication device, execution of a cell reselection in response to transmitting the confirmation message.

15. A first communication device, comprising:
a receiver;
a transmitter; and
a controller, the controller configured to:
establish a direct link between the first communication device and a second communication device that is a short-range communication device, the direct link being a direct link used in a sidelink;
execute a handover from a first cell to a second cell; and
execute the handover without releasing the direct link in response to the first communication device receiving, from the second cell, information indicating a specific resource pool within a group of resource pools available between devices in a sidelink, the specific resource pool available only between short-range devices, wherein
the transmitter is configured to transmit, a suspension message for suspending a direct communication through the direct link to the second communication device before executing the handover, and
the suspension message is transmitted in response to transmitting a measurement report by the first communication device to the first cell or in response to receiving a message for executing a handover by the first communication device from the first cell.

* * * * *